(12) United States Patent
Grimm et al.

(10) Patent No.: US 7,162,961 B2
(45) Date of Patent: Jan. 16, 2007

(54) SYSTEM AND METHOD FOR DISPENSING A VOLATILE LIQUID FERTILIZER

(75) Inventors: Jeffrey John Grimm, Hiawatha, KS (US); Graeme W. Henderson, Pasadena, CA (US); Troy Christmann Kolb, Hiawatha, KS (US)

(73) Assignee: Capstan AG Systems, Inc., Topeka, KS (US)

( * ) Notice: Subject to any disclaimer, the term of this patent is extended or adjusted under 35 U.S.C. 154(b) by 30 days.

(21) Appl. No.: 10/919,019

(22) Filed: Aug. 16, 2004

(65) Prior Publication Data

US 2005/0076818 A1 Apr. 14, 2005

Related U.S. Application Data

(60) Provisional application No. 60/495,636, filed on Aug. 15, 2003.

(51) Int. Cl.
- A01C 23/00 (2006.01)
- A01G 25/09 (2006.01)
- B05B 1/20 (2006.01)
- B05B 9/00 (2006.01)
- B05B 17/04 (2006.01)

(52) U.S. Cl. .................. 111/119; 111/900; 239/11; 239/147; 239/159; 239/172

(58) Field of Classification Search ............ 111/118, 111/119, 170, 176, 900; 239/146, 147, 159, 239/164, 172, 176, 1, 11
See application file for complete search history.

(56) References Cited

U.S. PATENT DOCUMENTS

| | | | |
|---|---|---|---|
| 3,556,027 A | 1/1971 | Ammann | |
| 4,062,306 A | 12/1977 | Wosmek | |
| 4,121,767 A | 10/1978 | Jensen | |
| 4,341,168 A | 7/1982 | Siebert | |
| 4,364,409 A | 12/1982 | Jones | |
| 4,458,609 A | 7/1984 | Tofte | |
| 4,523,280 A | 6/1985 | Bachman | |
| 4,530,463 A | 7/1985 | Hiniker et al. | |
| 4,553,702 A | 11/1985 | Coffee et al. | |
| 4,630,773 A | 12/1986 | Ortlip | |
| 4,657,568 A | 4/1987 | Jones | |

(Continued)

OTHER PUBLICATIONS

Article—*Performance of a Multipoint Pulse-Width Modulation Metering System for Ammonia*, M. D. Schrock, J. J. Grimm, D. L. Oard, R. K. Taylor, T. C. Kolb, and J. D. Anderson, Transactions f the ASAE, vol. 44(2), 2001, pp. 211-216.

(Continued)

*Primary Examiner*—Christopher J. Novosad
(74) *Attorney, Agent, or Firm*—Dority & Manning, P.A.

(57) ABSTRACT

A system and process for dispensing a liquid agrochemical such as ammonia into a field is disclosed. The ammonia is placed in a vessel under sufficient pressure to maintain a substantial portion of the ammonia in a liquid form. From the pressurized vessel, the ammonia is fed to a distribution manifold where it is ultimately injected into a soil through a plurality of dispensing tubes. A constant pressure flow rate control device is placed at each dispensing tube for metering the amount of ammonia fed to the soil. Furthermore, the outlet flow of each constant pressure rate control device is made to vaporize nearby the inlet flow path to create a heat exchange effect thereby cooling the inlet flow. In particular, the flow control devices allow ammonia to be dispensed from the system while maintaining sufficient back pressure and temperature within the distribution manifold to maintain the ammonia in a liquid form. By maintaining the ammonia in a liquid form, uniform and accurately controlled flow rates can be dispensed from the dispensing tubes.

46 Claims, 7 Drawing Sheets

U.S. PATENT DOCUMENTS

| | | |
|---|---|---|
| 4,703,891 A | 11/1987 | Jackson et al. |
| 4,807,663 A | 2/1989 | Jones |
| 4,967,957 A | 11/1990 | Bachman |
| 4,991,341 A | 2/1991 | Douglas |
| 4,997,129 A | 3/1991 | Waldrum |
| 5,033,397 A | 7/1991 | Colburn, Jr. |
| 5,077,653 A | 12/1991 | Barlet |
| 5,134,961 A | 8/1992 | Giles et al. |
| 5,170,820 A | 12/1992 | Jones |
| 5,182,704 A | 1/1993 | Bengtsson |
| 5,220,876 A | 6/1993 | Monson et al. |
| 5,260,875 A | 11/1993 | Tofte et al. |
| 5,334,987 A | 8/1994 | Teach |
| 5,348,226 A | 9/1994 | Heiniger et al. |
| 5,372,160 A | 12/1994 | Ward |
| 5,407,134 A | 4/1995 | Thompson et al. |
| 5,499,198 A | 3/1996 | Gaidos et al. |
| 5,520,333 A | 5/1996 | Tofte |
| 5,574,657 A | 11/1996 | Tofte et al. |
| 5,653,389 A | 8/1997 | Henderson et al. |
| 5,704,546 A | 1/1998 | Henderson et al. |
| 5,826,522 A | 10/1998 | Anders et al. |
| 5,967,066 A | 10/1999 | Giles et al. |
| 6,067,917 A | 5/2000 | Nimberger et al. |
| 6,117,217 A | 9/2000 | Jones |
| 6,138,590 A | 10/2000 | Colburn, Jr. |
| 6,142,177 A | 11/2000 | Jones |
| 6,148,746 A | 11/2000 | Kopycinski |
| 6,269,757 B1 | 8/2001 | Kiest |
| 6,283,049 B1 | 9/2001 | Swanson |
| 6,360,681 B1 | 3/2002 | Swanson |
| 6,422,162 B1 | 7/2002 | Nimberger et al. |
| 6,484,653 B1 | 11/2002 | Swanson |
| 6,622,939 B1 | 9/2003 | Swanson |
| 6,694,825 B1 | 2/2004 | Nimberger et al. |
| 6,748,884 B1 | 6/2004 | Bettin et al. |

OTHER PUBLICATIONS

Article—*Droplet Size And Spray Pattern Characteristics Of An Electronic Flow Controller For Spray Nozzles*, D. K. Giles and J. A. Comino, J. agric. Engng Res., vol. 47, 1990, pp. 249-267.

Article—*Spray Droplet Velocity and Energy in Intermittent Flow from Hydraulic Nozzles*, D. K. Giles and E. Ben-Salem, J. agric. Engng Res., vol. 51, 1992, pp. 101-112.

Article—*Intermittent Control of Liquid Flow from Fan Nozzles in Concurrent Air Streams: Wind Tunnel Studies of Droplet Size Effects*, D. K. Giles, B. W. Young, P. R. Alexander, and H. M. French, J. agric. Engng Res., vol. 62, 1995, pp. 77-84.

Brochure—*New . . . from Capstan AG Systems: Synchro™ The Next Generation of Ag Spraying Technology*, Aug. 1995, 4 pages.

SAE Technical Paper Series entitled *Variable Flow Control for Pressure Atomization Nozzles*, Durham K. Giles and John A. Comino, Sep. 11-14, 1989, pp. 1-13.

SYSTEM AND METHOD FOR DISPENSING A VOLATILE LIQUID FERTILIZER

RELATED APPLICATIONS

The present application is based on and claims priority to U.S. Provisional Patent Application No. 60/495,636 filed on Aug. 15, 2003.

FIELD OF THE INVENTION

The present invention generally relates to a system and to a process for applying a liquid fertilizer to soil. For instance, in one embodiment, a system is disclosed that uniformly applies ammonia to soil. The system operates at a wide range of flow rates, offers fast response times when changing flow rates, and allows the application rates to be precisely controlled and varied in response to changing circumstances.

BACKGROUND OF THE INVENTION

Anhydrous ammonia ($NH_3$) is commonly used as a soil fertilizer, since it is the most concentrated practical form of nitrogen. In conventional systems, when applying ammonia to soil, ammonia is placed in a tank under pressure. The tank is placed on a trailer and towed by a tractor. Some of the ammonia in the tank vaporizes creating pressure. This pressure is not only used to maintain most of the material in a liquid form, but is also used to force or pump the liquid from the tank.

In particular, liquid ammonia in the tank is pumped through a pressure regulator to a distribution manifold which leads to individual lines. Each individual line is connected to an injection knife which plows through the soil and applies the ammonia. The ammonia, as it travels through the distribution manifold, undergoes a phase change forming a gas which is ultimately applied as a fertilizer.

In order to control application rates, conventional ammonia application systems typically include a controller which adjusts the flow rate of the ammonia in proportion to the ground speed of the tractor or vehicle. The objective of the system is to maintain a desired amount of ammonia applied per unit of land area, usually expressed as pounds per acre or kilograms per hectare. For instance, the vehicle speed can be detected with a radar sensor which sends the speed information to a microprocessor. Based on the ground speed data, the microprocessor calculates the proper flow rate of ammonia necessary to achieve a desired application rate.

The controller can also receive ammonia flow rate information from a flow meter, usually a turbine-type, placed in the supply line between the ammonia tank and the manifold. The flow rate is adjusted by the controller using an electrically-actuated regulating valve also installed between the tank and the manifold. The regulating valve is generally a throttling-type valve that simply closes to restrict flow by increasing the pressure drop across the valve or opens to increase flow by reducing the pressure drop across the valve. A common problem with the above described system, however, is that the flow rate of the ammonia is difficult to accurately control and measure due to vaporization of the ammonia as it moves through the system. Vaporization of the ammonia can occur as a result of pressure decreases in the line due to emptying of the tank, as a result of warmer ambient conditions, and due to pressure drops that occur in the flow lines. Upon vaporization, the density of ammonia can change over a factor of 200:1. When the ammonia forms a liquid and vapor mixture, it cannot be measured accurately with the flow meter, which is designed only to measure liquid flow rates. Further drawbacks to such turbine type flow meters is that a high failure rate is seen due to over speeding the turbine when vapor is surged through the system, usually upon startup.

In order to remedy vaporization problems, the ammonia pumped from the pressurized tank can be chilled to a temperature so low that only liquid exists. This has been accomplished in the past by a refrigeration device that vents off a small amount of the ammonia (approximately 1%) flowing through the system. When the liquid ammonia is vented to atmospheric pressure, the heat of vaporization is absorbed from the system, cooling a heat exchanger which contacts the ammonia exiting the tank. The ammonia is then chilled and condensed to a pure liquid and thus can be easily metered. The ammonia vented to atmospheric pressure, on the other hand, can be directed into additional injector knives and applied to the soil.

The above described refrigeration system, however, only insures that the ammonia is in liquid form as it passes through the flow meter. The ammonia still vaporizes as it enters the distribution manifold creating other various problems. Specifically, pressure through the distribution manifold can vary between individual lines due to variable lengths and fittings. Pressure variations in the individual lines cause application rates of the ammonia to vary from knife to knife. This problem is especially magnified at lower pressures and flow rates where greater degrees of vaporization are more likely to occur.

Besides failing to maintain uniformity in the distribution of ammonia between the individual lines, the above described system also only operates within a narrow range of ammonia flow rates. The flow rate of the ammonia is directly tied to the pressure in the system. Specifically, the flow rate of ammonia is proportional to the square root of the pressure. Thus, in order to change flow rates, the pressure must be dramatically increased or decreased. For example, to achieve a 3:1 range of flow control, a 9:1 range of pressure variation is necessary. Pressure variation of the ammonia in the system, however, is limited to the range between the maximum pressure in the tank and the minimum pressure which can maintain the ammonia in a liquid state. Consequently, wide ranges of application rates are simply not practically possible.

Conventional systems as described above also have very slow response times due primarily to the slow actuation of the throttling valve used to control pressures and flow rates. Typical valves used in these systems can take between 1.5 to 10 seconds to change position.

Prior art systems have also failed to provide individual control of the flow of ammonia to each knife. As described above, the flow of ammonia is only controlled as it enters the distribution manifold, prior to the ammonia branching off into each individual line.

Thus, a need exists for an improved system and process for injecting volatile liquids, such as ammonia, into soil. In particular, a need exists for a robust ammonia application system that uniformly applies ammonia to soil, operates at a wide range of flow rates, offers fast response times when changing flow rates, and allows the ammonia application rates to be varied between the individual distribution lines.

A need also exists for a system that is not only capable of injecting volatile liquid fertilizers into soil, but can also inject non-volatile liquid fertilizers into soil without any major modifications.

SUMMARY OF THE INVENTION

The present invention recognizes and addresses the foregoing drawbacks and disadvantages of prior art constructions and methods.

In one embodiment, the present disclosure is directed to a system for maintaining a volatile liquid fertilizer, such as ammonia, in a liquid form while dispensing controlled amounts of the fertilizer into a soil. The system includes a fertilizer reservoir for holding a volatile liquid fertilizer under pressure sufficient to maintain a substantial portion of the fertilizer in a liquid form. The fertilizer reservoir includes an outlet for dispensing the liquid fertilizer.

A distribution manifold is placed in communication with the outlet and is in turn connected to a plurality of dispensing tubes designed to inject the volatile liquid fertilizer into a soil.

The system may also include a plurality of pressure reducing members that create a pressure reduction between the distribution manifold and each of the dispensing tubes. The pressure reducing member may be, for instance, an orifice or a flow rate control device, such as a constant pressure flow rate control device. By "constant pressure" flow rate control device is meant that the flow rate control device is capable of dispensing liquids without substantial changes in liquid pressure upstream. For instance, the constant pressure flow rate control devices control the flow rate at which the volatile liquid fertilizer is dispensed from the respective dispensing tubes without significantly decreasing the pressure of the fertilizer within the distribution manifold.

The outlet flow metered from each constant pressure flow rate control device, prior to entering the dispensing tube, is vaporizing nearby, but not intermixing with, the unmetered inlet flow thus creating a heat exchange effect which cools the unmetered inlet flow, preventing it from vaporizing as it is metered and distributed.

A controller in communication with pressure sensors and the constant pressure flow rate control device, adjusts the flow rate control devices for dispensing the volatile liquid fertilizer at a selected flow rate. The controller dispenses the fertilizer while maintaining the volatile liquid fertilizer at a pressure and temperature within the distribution manifold sufficient to maintain the fertilizer in a liquid form as it passes through the constant pressure rate control devices.

In one embodiment, each of the constant pressure flow rate control devices includes a valve that pulsates between open and closed positions according to a duty cycle. The duty cycle of each valve can be determined and controlled by the controller for controlling fertilizer flow rates. In fact, the controller can be configured to control the constant pressure flow rate control devices independently for varying the flow rate of the volatile liquid fertilizer between each of the dispensing tubes.

In one preferred embodiment, the system includes a first temperature sensing device positioned within the distribution manifold ahead of the metering device(s), a second temperature sensing device positioned within the distribution manifold and downstream of the metering device(s), a first pressure sensing device positioned within the distribution manifold upstream of the metering device(s), and a second pressure sensing device located within the distribution manifold downstream of the metering device(s). The controller can be configured to receive information from both temperature sensing devices and from both pressure sensing devices for automatically maintaining the volatile liquid fertilizer within preset flow rate ranges within the system.

In one embodiment, the constant pressure rate control devices are located very close to the soil such that the volatile liquid fertilizer is injected under pressure behind a low draft tillage tool.

In an alternative embodiment, the constant pressure rate control devices are replaced by fixed orifices to provide accurate distribution only. This simplified version of the invention, further simplified by the elimination of temperature and pressure sensors, can be used as an improvement to prior art systems. Prior art metering systems can be used separately, and this new invention used downstream, employing the novel approach of vaporization of the outlet flow to cool the inlet flow as a distribution means only.

A process is also disclosed for dispensing controlled amounts of a volatile liquid fertilizer into a soil. The process includes the steps of providing a volatile liquid fertilizer in a pressurized vessel. The pressure in the vessel is sufficient to maintain a substantial portion of the volatile liquid fertilizer in a liquid form. The volatile liquid fertilizer is dispensed into a distribution manifold.

From the distribution manifold, the fertilizer is injected into a soil at a predetermined flow rate through a plurality of dispensing tubes. In accordance with the present invention, the fertilizer is maintained in a liquid form throughout the distribution manifold.

For instance, the flow rate of the volatile liquid fertilizer entering the dispensing tubes can be controlled by a plurality of constant pressure flow rate control devices. The constant pressure flow rate control devices control the flow rate of the fertilizer without significantly reducing the pressure of the fertilizer within the distribution manifold.

Of particular advantage, the above system is not only well suited to dispensing volatile liquid fertilizers but is equally well suited to dispensing non-volatile liquid fertilizers. Thus, different types of fertilizers may be dispensed from the system without significantly modifying any of the components.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF REPRESENTATIVE EMBODIMENTS

It is to be understood by one of ordinary skill in the art that the present discussion is the description of exemplary embodiments only and is not intended as limiting the broader aspects of the present invention, which broader aspects are embodied in the exemplary construction.

The present invention is generally directed to a system and to a process for applying a liquid fertilizer, such as ammonia, to a field. The system includes a pressurized tank for containing a liquid fertilizer. The pressurized tank is in fluid communication with a distribution manifold, which is connected to a plurality of dispensing tubes that inject the fertilizer into a soil. In accordance with the present invention, the system includes a pressure-independent flow control device located at each dispensing tube. The flow control devices meter the volatile liquid fertilizer into the soil at a predetermined flow rate while maintaining sufficient back pressure and temperature within the distribution manifold to prevent the volatile liquid fertilizer from vaporizing. By maintaining the fertilizer in a liquid form throughout the system, many advantages and benefits are obtained that were not before realized in the prior art.

For instance, by preventing a substantial amount of vaporization of the liquid fertilizer in the distribution manifold, the flow of fertilizer to each dispensing tube is uniform. Further, because the system of the present invention uncouples the dependency between flow rate and liquid pressure, the system offers much greater flow control ranges. For example, thus far it has been shown that a 30:1 range of flow control of the liquid fertilizer is possible. In various embodiments, however, the system of the present invention can be configured to operate within a particular range of flow control. For example, in various embodiments, the range of flow control may be 25:1, 20:1, 10:1, and the like.

Besides operating at a wide range of flow rates, the system of the present invention has extremely fast response times when changing flow rates. Specifically, the system of the present invention is capable of changing flow rates at response times less than 0.5 seconds, which offers dramatic improvements over conventional systems that typically had response times between 1.5 seconds to 10 seconds. Further, because a flow control device is installed at each dispensing tube, the application rate of the fertilizer can be varied between each of the dispensing tubes. This resolution, coupled with the fast response times, allows total control of fertilizer application rates. In particular, the rate at which the fertilizer is injected into the soil can be continuously monitored and changed depending upon the speed at which the system is moved across a field, the type of soil that is being treated, the dimensions of the treated area, and based on any other factors and circumstances.

Figure 1:
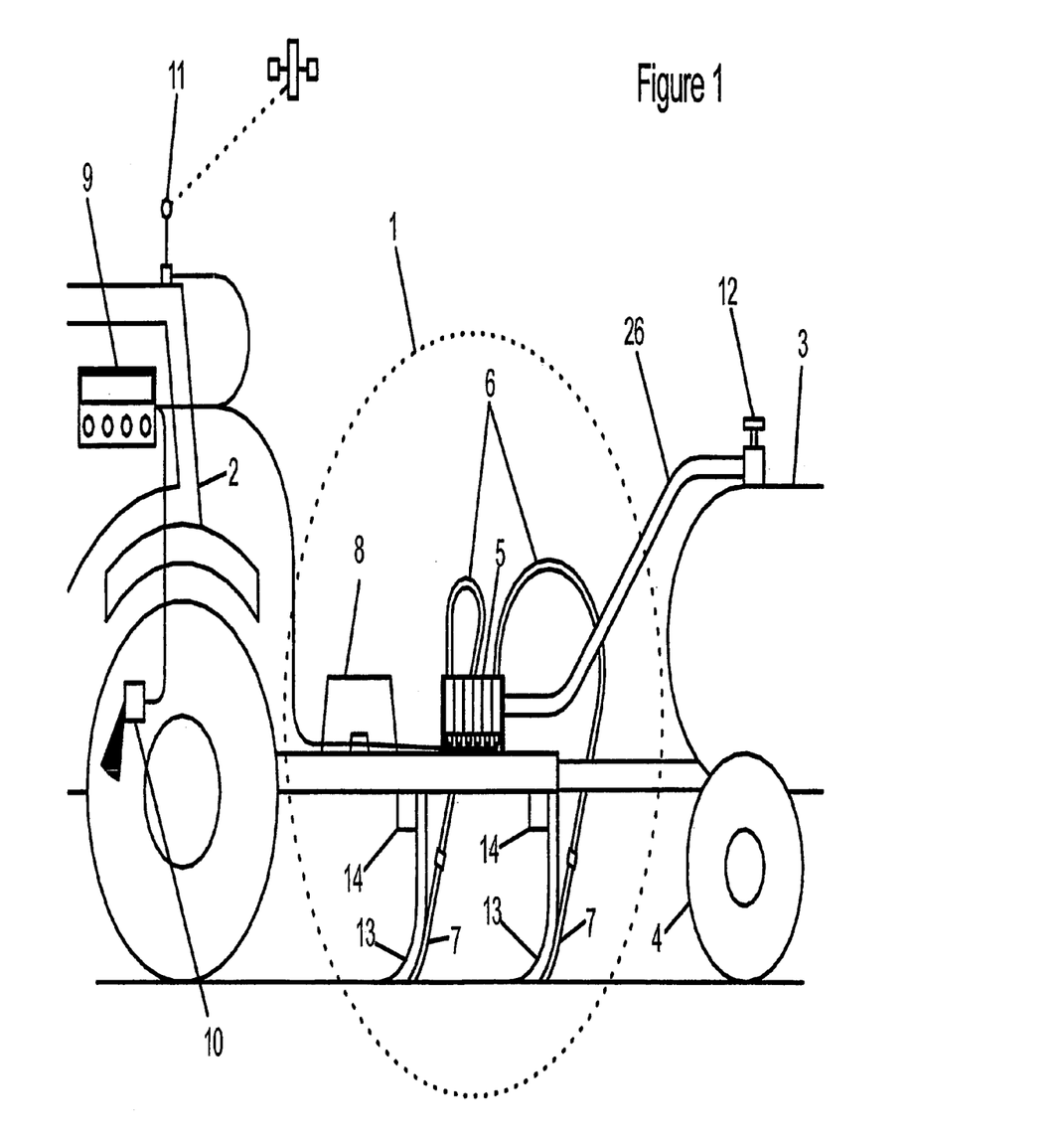
FIG. 1 is a side view of one embodiment of an agrochemical dispensing system made in accordance with the present invention.

Referring to FIG. 1, a liquid fertilizer application system is illustrated. System 1, in this embodiment, is being drawn across a field by a tractor 2. System 1 includes a pressurized vessel 3, which is adapted to hold and maintain a substantial portion of the liquid fertilizer, which may be ammonia, in a liquid state. As shown, pressurized vessel 3 can be mounted on a trailer 4 which is hitched to tractor 2. Pressurized vessel 3 generally employing a valve 12 to facilitate the stoppage of flow required to disconnect pressurized vessel 3 from system 1.

The liquid fertilizer application system as shown in FIG. 1 may be used to dispense volatile liquid fertilizers such as ammonia in addition to non-volatile liquid fertilizers, such as various nitrogen solutions and/or ammonium hydroxide mixtures. When dispensing a non-volatile liquid fertilizer, the vessel 3 may remain at atmospheric pressure if desired. Although the system is capable of dispensing non-volatile liquid fertilizers, the remaining disclosure is generally directed to using the system for dispensing volatile liquid fertilizers.

In addition to liquid fertilizers, it should be understood that the system of the present invention may be used to dispense any suitable fluid into a crop field. For example, the system of the present invention can also be used to dispense herbicides, insecticides, pesticides, growth regulators, desiccants, defoliants, fungicides, rodenticides, and the like. Other fertilizers that may be dispensed according to the present invention include nutrient stabilizers, soil conditioners, root stimulants, and the like.

The pressure contained within vessel 3 is used to pump the ammonia from the vessel into a distribution manifold 5, via. conduit 26. Distribution manifold 5 includes a plurality of supply lines 6. Supply lines 6 are each connected to a dispensing tube 7 for injecting the ammonia into a soil.

In one embodiment, the vessel 3 may be heated during application of a liquid fertilizer. For example, any suitable heater may be placed in communication with the vessel. In one particular embodiment, for example, the heater may comprise a heat exchanger that receives a heat source from the tractor 2. For instance, the heat exchanger may be placed in communication with the tractor's engine cooling system. In other embodiments, the heater may comprise a fuel fired furnace, a solar system, or the like.

Control of the system 1 is facilitated by a control unit 8 which is in communication with system 1. Control unit 8 receiving input from the operator panel 9. The operator panel 9 receiving input from the operator, who may employ outside systems to provide control parameters, including but not limited to a speed sensor 10 and/or spatial position sensor 11.

In one embodiment, for instance, the controller is in communication with the speed sensor 10 as the system is moved over a field. The controller may be configured to receive speed information from the speed sensor for determining the flow rate at which the liquid fertilizer is dispensed into the soil.

Alternatively, the controller may be in communication with a global positioning location and rate map device. The global positioning rate map device may be configured to determine the location of the dispensing tubes. The controller, based on receiving information from the global positioning rate map device, may then determine flow rates for dispensing the liquid fertilizer.

As shown, each of the dispensing tubes 7 are positioned behind a corresponding knife or chisel plow 13, which is adapted to plow through a field and allow the ammonia to be injected below the surface of the soil. Knives 13 are attached to a boom 14 which is also used to support distribution manifold 5, supply lines 6, and control unit 8.

Figure 2:
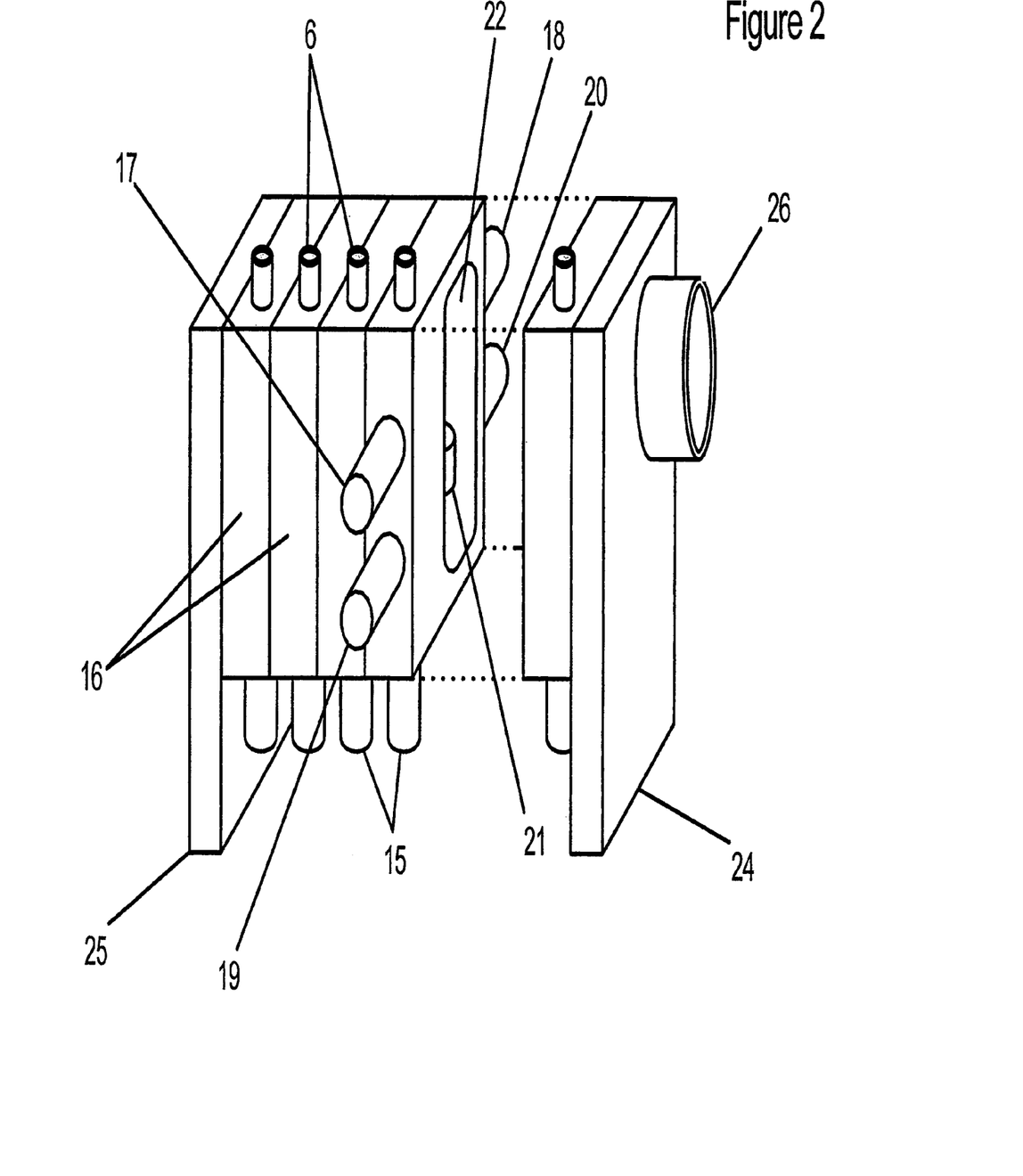
FIG. 2 is a perspective view of one embodiment of a fluid manifold that may be used in accordance with the present invention.

FIG. 2 further describes distribution manifold 8. Distribution manifold 8 being comprised of a plurality of segments 16 which provide attachment features for the constant pressure flow rate device 15, supply line 6, pressure sensing devices 17 & 18, temperature sensing devices 19 & 20, and float activated switch 21. The segments 16, when fastened together create a common internal passageway 22 and plurality of passageways 23 (plurality of passageways 23 hidden in FIG. 2, but clearly shown in FIG. 3). The number of segments 16 providing the proper passageway 22 & 23 volumes to accommodate the flow contributed by the constant pressure flow rate device 15. Inlet plate 24 and outlet plate 25 providing closure to passageway 22, and providing mounting surfaces for conduit 26. A seal being employed between each segment 16 and between segments 16 and inlet plate 24, and between segments 16 and outlet plate 25 being of o-ring, gasket, adhesive, or other common method, and fastened together by tension rods, bolts, or other common method.

Figure 3:
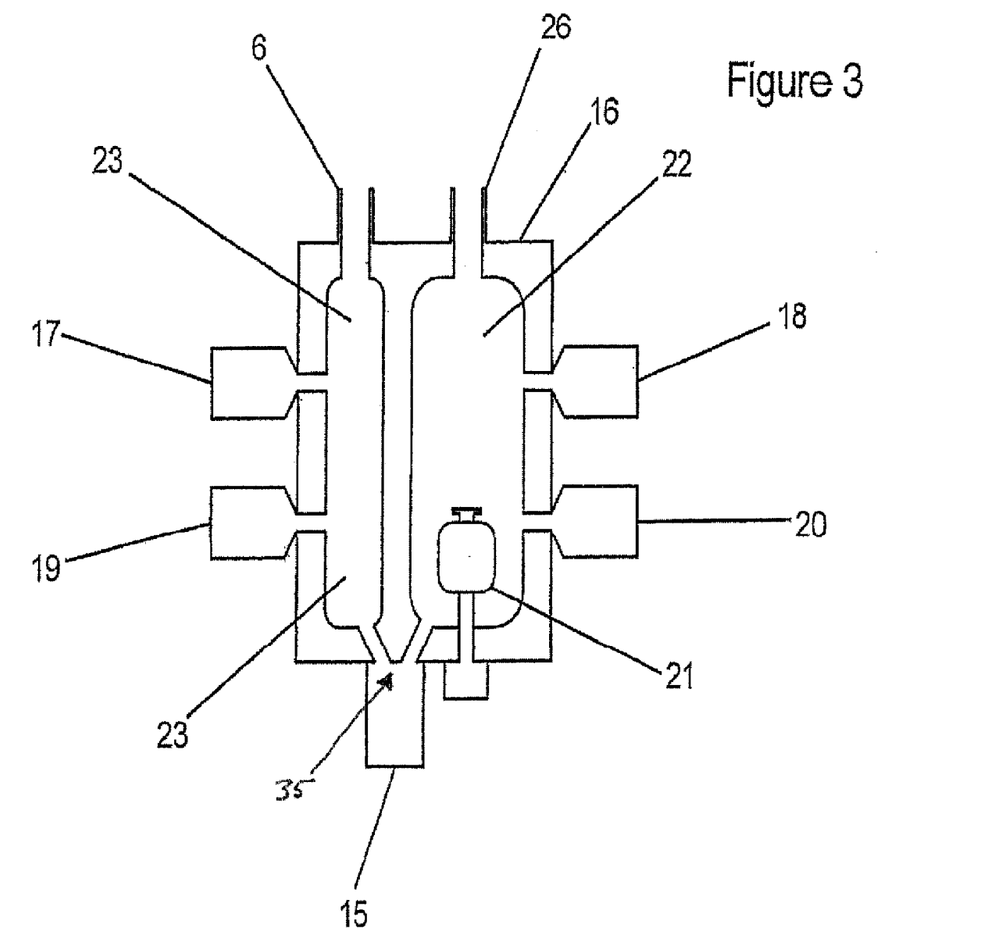
FIG. 3 is a cross sectional view of the manifold illustrated in FIG. 2.
Figure 4:
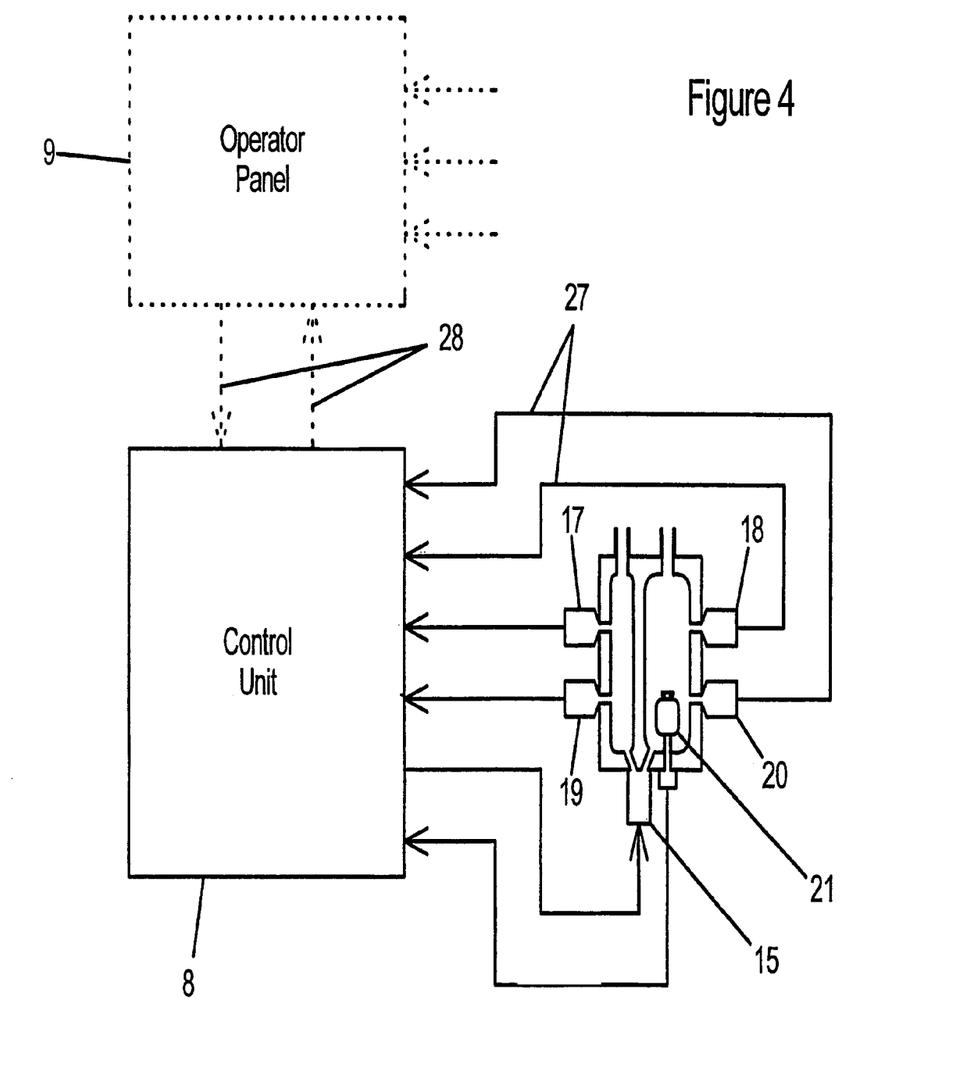
FIG. 4 is a plan view of one embodiment of an agrochemical dispensing system made in accordance with the present invention.

In accordance with the present invention, system 1 further includes a plurality of constant pressure flow rate control devices 25 whereby the outlet flow metered from each constant pressure flow rate control device, prior to entering the dispensing tube, is vapoulzing nearby, but not intermixing with, the unmetered inlet flow thus creating a heat exchange effect which cools the unmetered inlet flow, preventing it from vaporizing as it is metered and distributed, as more particularly shown in FIG. 3 by a heater-cooler arrangement or heat exchanger 35. Volatile liquid fertilizer entering the inlet passageway 22 via conduit 26. Volatile liquid fertilizer in passageway 22 being comprised of both liquid and vapor, whereby gravity causes vapor to rise and liquid to fall. Float switch 21 rises and falls with the liquid level alarming the operator when liquid is not present. Pressure sensing device 18 and temperature sensing device 20 measuring conditions within passageway 22 where pressure and temperature are at values slightly less than the pressure and temperature within the pressurized vessel 3. Volatile liquid fertilizer in liquid form enters constant pressure flow control device 15 where it undergoes a controlled release into passageway 23 and continues on to supply line 6. Pressure sensing device 17 and temperature sensing device 19 measuring conditions within passageway 23 where pressure and temperature are at values significantly less than the pressure and temperature within passageway 22. The difference in temperature causing heat to flow from passageway 22 to passageway 23 thus cooling the volatile liquid fertilizer within passageway 22. Thus condensing vapor into liquid at a rate sufficient to maintain a continuous liquid state of volatile liquid fertilizer as it enters the constant pressure flow control device 15.

In one embodiment, cooling of the liquid fertilizer in the distribution manifold is done without venting any vapors to the atmosphere. In other words, cooling is accomplished using internal elements.

As described above, by maintaining ammonia as a liquid within distribution manifold 5, much more control is achieved over the fertilizer as it flows through the system. In particular, unwanted variations in the application rates of the fertilizer from dispensing tube to dispensing tube are prevented from occurring, increasing the uniformity of flow to each individual tube.

Each constant pressure flow rate control device 15 can include a valve that pulsates between an open position and a closed position by an actuator according to a duty cycle. Preferably, the valve is controlled by an electrically actuated solenoid, but may also be pneumatically or hydraulically actuated. The term duty cycle of the pulsating valve as used herein is defined as the percentage of time the valve is open divided by the total operation time. The duty cycle controls the flow rate of the fertilizer through the dispensing tubes in a rapid on/off manner.

Such pulsating valves as described above were developed by one of the present inventors for use in other systems. For instance, such valves are described in an article entitled "Droplet Size and Spray Pattern Characteristics of an Electronic Flow Controller for Spray Nozzles" by Giles, et al appearing in The Journal of Agricultural Engineering Research, Volume 47 at Pages 249–267 (1990); in an article entitled "Spray Droplet Velocity and Energy in Intermittent Flow From Hydraulic Nozzles" by Giles, et al appearing in The Journal of Agricultural Engineering Research, Volume 51 at Pages 101–112 (1992); in an article entitled "Intermittent Control of Liquid Flow From Fan Nozzles in Concurrent Air Streams: Wind Tunnel Studies of Droplet Size Effects" by Giles, et al appearing in The Journal of Agricultural Engineering Research, Volume 62 at Pages 77–84 (1995); in U.S. Pat. No. 5,134,961 to Giles, et al entitled "Electrically Actuated Variable Control System"; and in U.S. patent application Ser. No. 08/528,941 to Henderson (now U.S. Pat. No. 5,653,389) entitled "Independent Flow Rate and Droplet Size Control System and Method for Sprayer", all of which are herein incorporated by reference in their entireties. More information regarding commercially available solenoid-actuated valves that may be used in the present invention can be obtained from the assignee of the present disclosure, Capstan Ag Systems, Inc. of Topeka, Kans.

During use, as described in FIG. 4, constant pressure flow rate control device 15, float switch 21, temperature sensing devices 19 & 20, pressure sensing devices 17 & 18, can be connected to the control unit 8 via electrical leads 27. The control unit 8, which can be a microprocessor or other programmable device, can be adapted to calculate a actual flow rate of the ammonia or fertilizer through the valve. Knowing the flow rate, the control unit 8 can increase or decrease the flow rate of the ammonia or fertilizer flowing through the pulsing valve 15 to achieve a desired application rate as determined by the operator and communicated to the control unit 8 using operator panel 9 via. electrical leads 28.

Specifically, the control unit 8 can employ a variable frequency, variable duty cycle, square wave generator that produces the output pulses with the desired frequency and width or time duration. Pulsating valve 15 receives the signals from the control unit 8 and opens and closes in response to the output pulses. The signal generated by the control unit 8 and received by the valve 15 determines the flow rate of the fertilizer flowing through the dispensing tubes.

In conjunction with the control unit 8, the system as shown in FIG. 1 may operate in various manners. For example, in one embodiment, the constant pressure flow rate control devices may operate in a fixed, non-controlled manner yielding the flow controllabilities of the system but retaining distribution properties. In this embodiment, the resulting system may be able to perform in conjunction with existing flow control systems to improve distribution accuracy.

Additionally, the constant pressure flow rate control devices may possess manually adjustable flow parameters yielding the automatic flow controllabilities of the system, but being able to be manually adjusted to provide distribution benefits within multiple flow ranges.

The control unit 8 may operate alone or in conjunction with other control units. For example, in one embodiment, the control unit 8 may calculate flow rates that are then provided to an external commercially available electronic flow rate controller.

Each of the individual constant pressure flow rate control devices may be the same or different when incorporated into the system. In one embodiment, for instance, the flow rate control devices may have varying sizes and/or operate at different duty cycles to facilitate fractional flows required for control on intentional non-uniform application conditions in the direction of travel. Such conditions occur when having overlapping end rows or inconsistent row spacing within a field. Of particular advantage, the individual constant pressure flow rate control devices may stop flow altogether to accommodate intermittent system size changes during operation.

As shown in FIG. 1, a single agrochemical dispensing system made in accordance with the present invention is shown. It should be appreciated, however, that multiple systems may be incorporated together. For example, the system may include parallel manifolds and dispensing tubes for dispensing either the same fluid at different rates or for dispensing more than one fluid simultaneously. In this embodiment, a single controller may be used to control the multiple systems or each system may include a separate controller.

Figure 5:
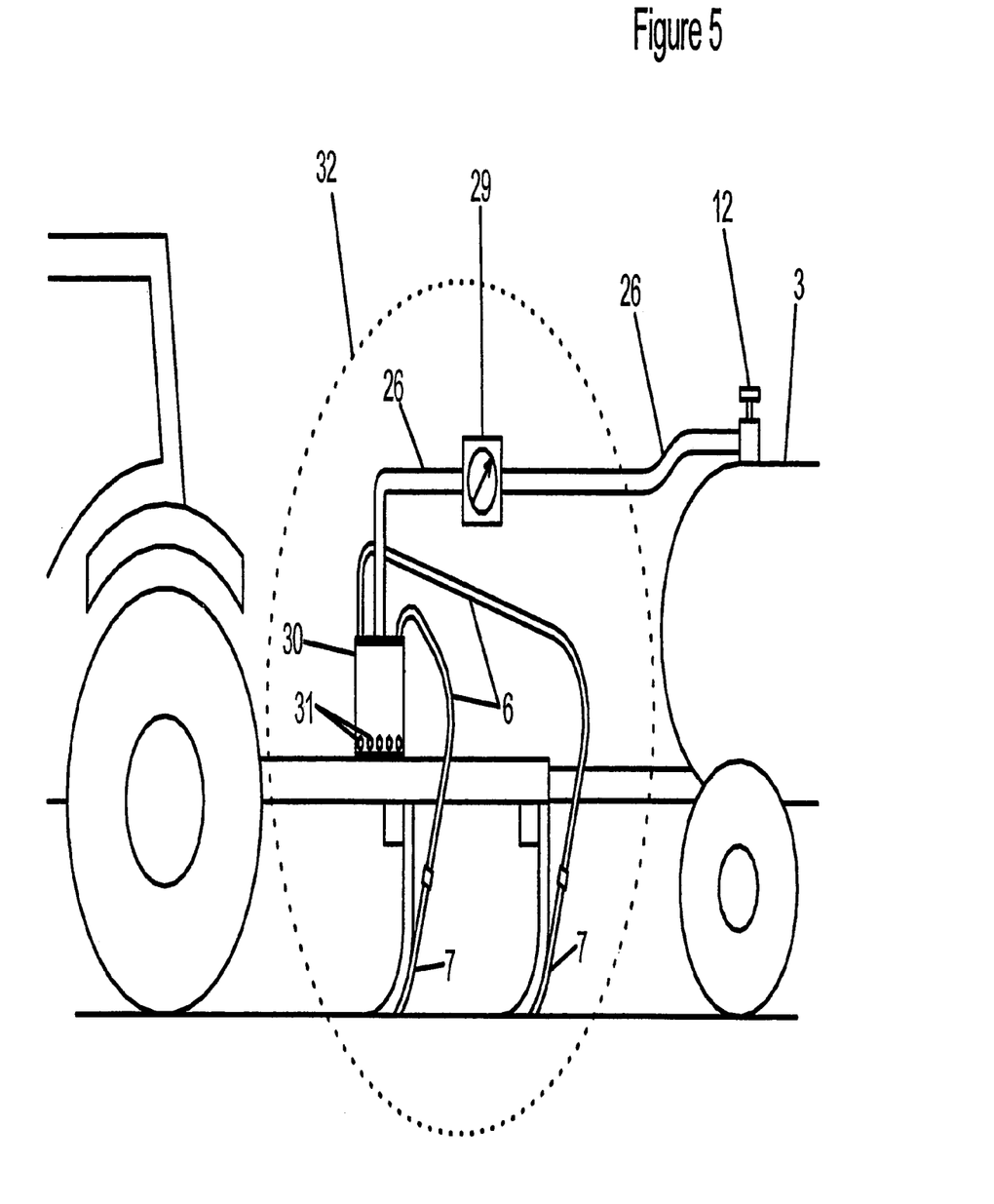
FIG. 5 is a side view of an alternative embodiment of an agrochemical dispensing system made in accordance with the present invention.

Referring to FIG. 5, another alternative embodiment of a liquid fertilizer application system, System 32, made in accordance with the present invention is illustrated. In a basic form, the system 32 includes pressurized tank 3 containing liquid ammonia, tank valve 12, and conduit 26 which is in fluid communication with a conventional volatile liquid fertilizer metering device 29 as commonly found in the industry. The conventional volatile liquid fertilizer metering device 29 can be of any design which meters the flow of volatile liquid fertilizer including but not limited to spring type regulators, electronic flowmeter and regulating valve systems, or positive displacement pump metering systems. Distribution manifold 30 being in fluid communication with distribution manifold 30 via. conduit 26. Distribution manifold 30 comprised of a plurality of fixed orifices 31, which are in turn each connected to supply line 6. Each supply line 6 is connected to a dispensing tube 7 where volatile liquid fertilizer is applied to the soil.

Figure 6:
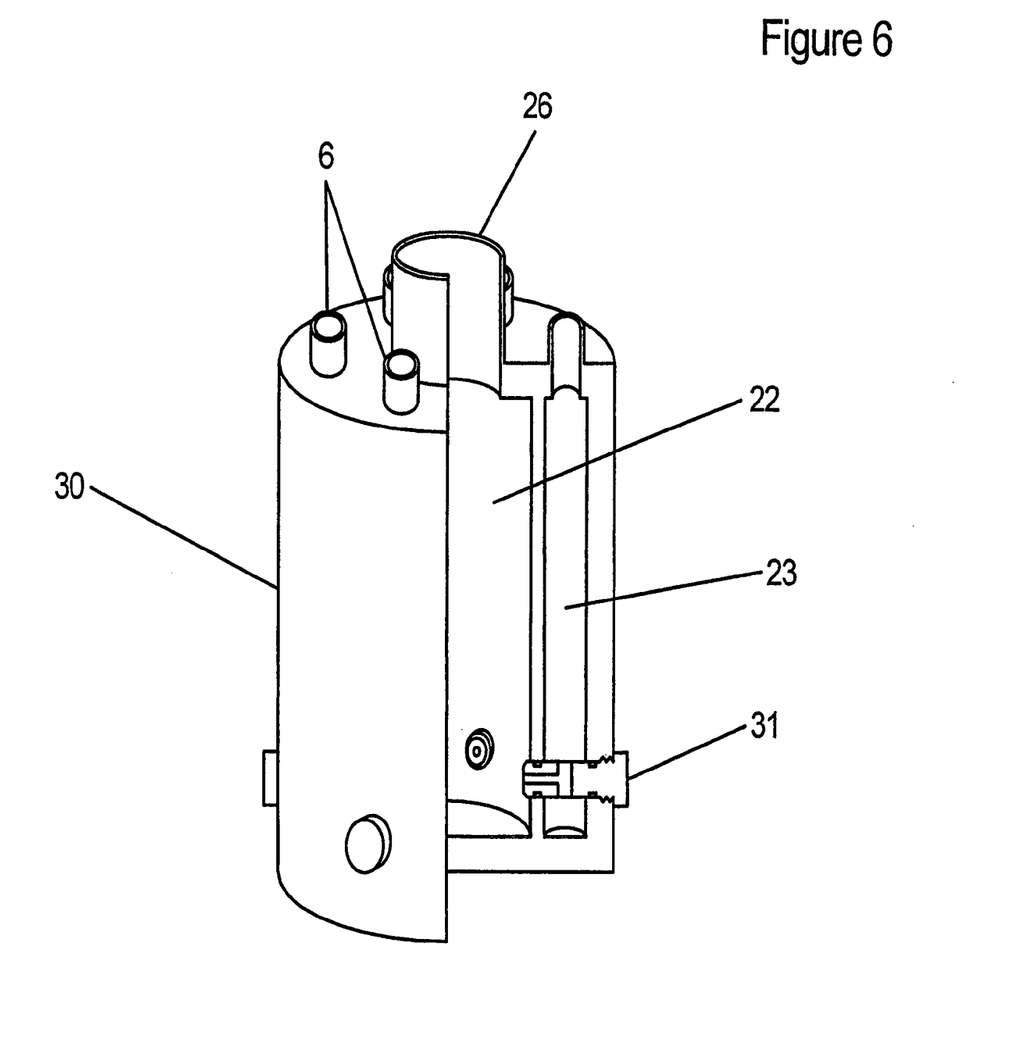
FIG. 6 is a perspective view with cutaway portions of an alternative embodiment of a manifold for use in the system of the present invention.

As described in FIG. 6, volatile liquid fertilizer would be metered by metering device 29 and flow into the distribution manifold 30 via. conduit 26. Volatile liquid fertilizer entering passageway 22 in partial vapor, partial liquid state, whereby vapor will rise and liquid will fall. Liquid state volatile liquid fertilizer will pass from passageway 22 into a plurality of passageways 23 via fixed orifice 31 whereby a significant decrease in pressure will occur causing volatile liquid fertilizer to change from liquid state to vapor state and undergo a significant decrease in temperature. The difference in temperature causing heat to flow from passageway 22 to passageway 23 thus cooling the volatile liquid fertilizer within passageway 22. Thus condensing vapor into liquid at a rate sufficient to maintain a continuous liquid state of volatile liquid fertilizer as it enters the fixed orifice 31.

Of particular advantage of system 32 is that, by providing a continuous liquid state to the fixed orifice 31, flow will pass through each fixed orifice 31 with a high degree of uniformity. Thus the operator achieving application rate accuracy using any type of conventional metering device 29 while also achieving distribution uniformity using distribution manifold 30. The size of fixed orifice 31 would be determined by the desired flow rate to each supply line 6 and the available pressure differential between passageway 22 and passageway 23. In addition to uniformity, controlled non-uniformity can be gained by using varying orifice sizes. This technique would be advantageous when applying volatile liquid fertilizer to non-uniform row spacing, for instance, or on implements where the outside dispensing tube 7 overlaps with the previous tractor pass.

Figure 7:
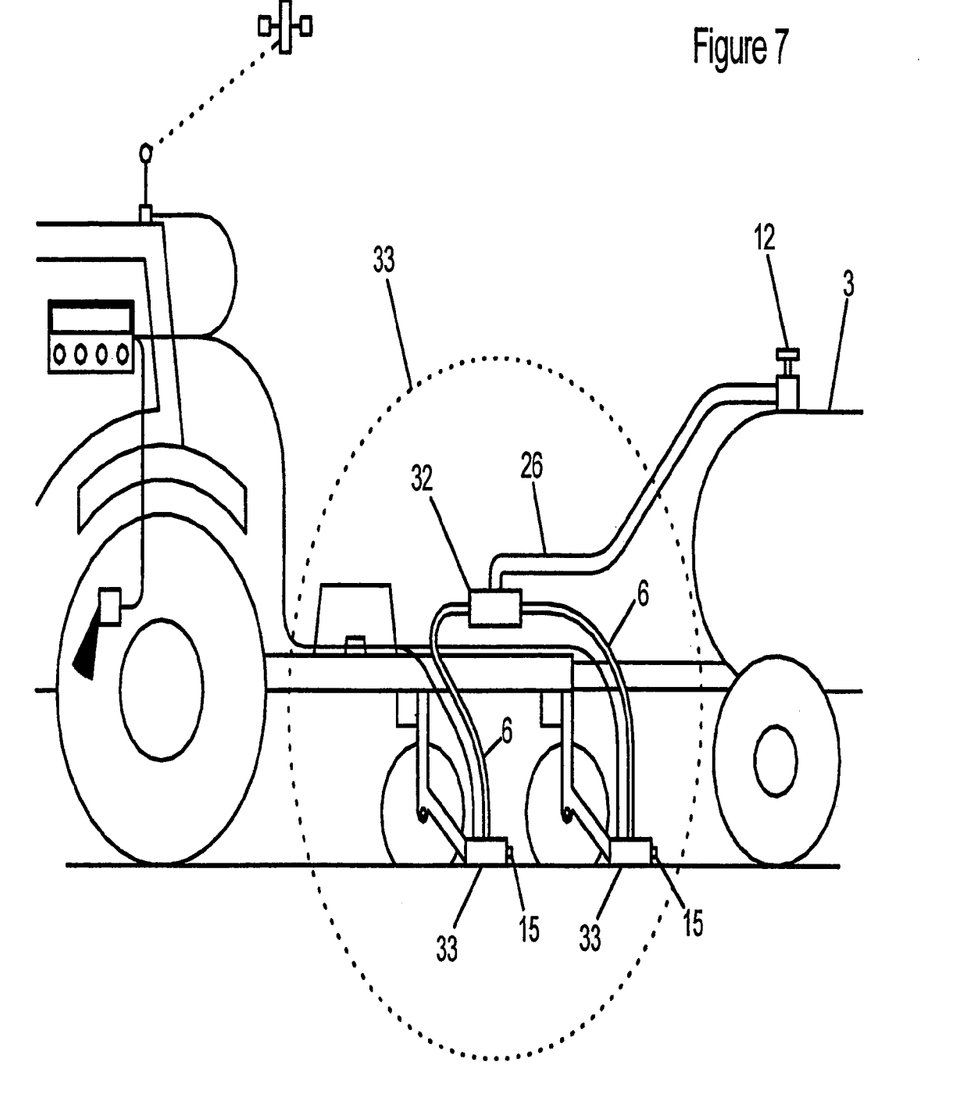
FIG. 7 is a side view of still another embodiment of an agrochemical dispensing system made in accordance with the present invention.

Referring to FIG. 7, another alternative embodiment of a liquid fertilizer application system, system 34, made in accordance with the present invention is illustrated. In a basic form, the system 34 includes pressurized tank 3 containing liquid ammonia, tank valve 12, and conduit 26 which is in fluid communication with a conventional distribution manifold 32 of fundamental design and commonly found in the industry. Distribution manifold 32 being in fluid communication with a plurality of application units 33 via. supply lines 6. Application unit 33 comprising the same fundamental design and function as the segment 16 shown in FIG. 3, including a constant pressure flow control device 15, but unique to this embodiment, each application unit 33 is physically independent from the plurality of application units 33 and each application unit 33 is located very close to the soil.

Of particular advantage of system 34 is that, by locating the application unit 33 close to the soil, a higher percentage of liquid state volatile liquid fertilizer will be achieved at the application point, requiring less soil contact to facilitate the binding of volatile fertilizer to the soil, resulting in a decreased degree of soil plowing, resulting in a decreased tractor power requirement. This decreased requirement of tractor power substantially increases the productivity of the application process.

The present invention may be better understood with reference to the following example.

EXAMPLE

A liquid fertilizer distribution system as shown in FIG. 1 was manufactured and tested. The system included a multiplate stacked valve system point and was comprised of a set of aluminum segments. Each segment included two valves so that the number of plates could be varied to produce a desired number of outlets. In this embodiment, constant pressure flow rate control devices were used to dispense liquid fertilizer into dispensing tubes.

The inlet side of the constant pressure flow rate control devices operated very close to the tank pressure and the discharge side operated at pressures less than about 400 kPa.

The constant pressure flow rate control devices had an orifice that was 2.36 mm in diameter. The diameter of the outlet increased from 2.36 mm to 6.35 mm. The outlet passage had a diameter of 12.7 mm.

Each of the constant pressure flow rate control devices included a valve plunger that was lifted by a 14 watt, 12-VDC coil. The coils were actuated by a 3 Hz CAPSTAN SHARPSHOOTER driver circuit. The driver circuit produced duty cycles from 3% to 100%.

The system was used to dispense ammonia. The duty cycle of the valves was varied. The following results were obtained:

| Duty Cycle (%) | Flow (kg/hr) | CV (%) | Pin (kPa) | Pout (kPa) |
|---|---|---|---|---|
| 10 | 15.3 | 6.11 | 469.2 | 13.8 |
| 30 | 43.0 | 5.49 | 471.3 | 86.3 |
| 50 | 67.5 | 6.71 | 474.7 | 100.1 |
| 70 | 88.9 | 7.87 | 472.7 | 124.2 |
| 90 | 106.2 | 9.29 | 457.5 | 139.4 |

In the above table, CV represents the coefficient of variation. Pin and Pout are the pressures before and after the constant pressure flow rate control devices.

During the run, the liquid fertilizer contained in the distribution manifold was cooled due to the configuration of the system. The flow was proportional to the duty cycle generally according to the following equation:

$$F = C * DC * (\Delta P)^{0.5}$$

Where: F=NH$_3$ flow (kg/hr)
C=Regression coefficient
DC=Duty Cycle (% high)
ΔP=Pressure drop across the valve (kPa)

As shown above, the above system had a flow rate capacity of about 106 kg/hr and had a knife-to-knife coefficient of variation of less than about 10%.

A second series of tests was then completed in which the inlet orifice of the constant pressure flow rate control devices was increased to 3.97 mm and the outlet passage was backdrilled to increase the diameter. The following results were obtained:

| DC (%) | Flow (kg/hr) | CV (%) | Pin (kPa) | Pout (kPa) |
|---|---|---|---|---|
| 20 | 50.1 | 5.27 | 924.6 | 43.7 |
| 50 | 120.1 | 6.22 | 922.3 | 112.7 |
| 90 | 214.7 | 4.28 | 920 | 250.7 |

In the above tests, noticeable cooling of the liquid fertilizer in the distribution manifold was observed. As shown above, maximum flow increased to 214.7 kg/hr while the coefficient of variation was always below 6.22%. During this test, it was also discovered that the flow rate may be easily predicted based upon the same equation provided above.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A system suitable for dispensing controlled amounts of either a volatile liquid or a non-volatile liquid into a soil, said system comprising:
   a liquid reservoir for holding a liquid agrochemical, said reservoir including an outlet for dispensing said liquid agrochemical;
   a distribution manifold in communication with said outlet of said reservoir, said distribution manifold being connected to a plurality of dispensing tubes designed to inject said liquid agrochemical into the soil; and
   a plurality of pressure reducing members, each of said pressure reducing members being in communication with a corresponding dispensing tube, the pressure reducing members creating a pressure reduction between the distribution manifold and each of the dispensing tubes, wherein, when dispensing a volatile liquid agrochemical, the pressure reducing members cause the volatile liquid agrochemical, prior to entering the plurality of dispensing tubes, to partially vaporize but not intermix with, the liquid agrochemical contained in the distribution manifold thus creating a heat exchange effect which cools the liquid agrochemical contained in the distribution manifold.

2. A system as defined in claim 1, wherein the distribution manifold defines a common passageway that is in communication with each of the dispensing tubes.

3. A system as defined in claim 1, wherein the pressure reducing members further comprise flow rate control devices.

4. A system as defined in claim 3, wherein each of said flow rate control devices comprises a valve that pulsates between open and closed positions according to a duty cycle.

5. A system as defined in claim 4, wherein said duty cycle of each of said flow rate control devices is determined and controlled by a controller.

6. A system as defined in claim 5, wherein said controller is configured to control said flow rate control devices independently for selectively varying the flow rate of said liquid agrochemical between each of said dispensing tubes.

7. A system as defined in claim 3, further comprising a speed sensing device for sensing the speed at which said system is moved over a field, said controller receiving speed information from said speed sensing device for determining the flow rate at which said liquid agrochemical is dispensed into said soil.

8. A system as defined in claim 1, wherein each of the pressure reducing members comprises an orifice.

9. A system as defined in claim 1, further comprising a controller in communication with at least one metering device, the controller being configured to control the metering device for dispensing the liquid agrochemical at a desired rate.

10. A system as defined in claim 9, wherein the system further includes a sensor configured to detect low levels of liquid agrochemical contained in the distribution manifold.

11. A system as defined in claim 10, wherein the sensor comprises a float activated switch.

12. A system as defined in claim 9, further comprising a global positioning location and rate map device in communication with said controller, said global positioning rate map device being configured to determine the location of said dispensing tubes, said controller receiving information from said global positioning rate map device and, based on said information, determining flow rates used in controlling said pressure reducing members.

13. A system as defined in claim 1, further comprising a valve for increasing the flow at which said liquid agrochemical is dispensed from the agrochemical reservoir.

14. A system as defined in claim 1, further comprising at least two temperature sensing devices, one of said temperature sensing devices monitoring the temperature of said liquid agrochemical prior to entering the pressure reducing members, the other temperature sensing device monitoring the temperature of the liquid agrochemical after flowing through the pressure reducing members;
   at least two pressure sensing devices, one of the pressure sensing devices monitoring the pressure of the liquid agrochemical prior to entering the pressure reducing members, the other pressure sensing device monitoring the pressure of the liquid agrochemical after flowing through the pressure reducing members; and
   a controller configured to receive information from the temperature sensing devices and the pressure sensing devices and, based on the received information, to control the pressure reducing members for dispensing the liquid agrochemical at a desired rate and, when dispensing a volatile liquid agrochemical, at a rate that maintains the volatile liquid agrochemical in the distribution manifold as substantially a liquid.

15. A system as defined in claim 1, wherein the system is capable of dispensing the liquid agrochemical from each dispensing tube at an application rate of from about 25 pounds per acre to about 250 pounds per acre.

16. A system as defined in claim 1, wherein the system further comprises a heater for heating the liquid agrochemical contained in the agrochemical reservoir.

17. A system as defined in claim 16, wherein the heater comprises a heat exchanger that receives heat from a vehicle that traverses the system across a field.

18. A system as defined in claim 1, wherein the pressure reducing members are located near the end of the dispensing tubes adjacent the soil.

19. A system as defined in claim 1, wherein the distribution manifold includes a plurality of segments, the segments forming a common passageway when assemblied together, at least certain of the segments including a dispensing channel in communication with a corresponding dispensing tube, the pressure reducing members being located in between the common passageway and the dispensing channels, the segments being removable for varying the size of the distribution manifold and for increasing or decreasing the amount of dispensing tubes.

20. A system as defined in claim 1, wherein, when dispensing a volatile liquid agrochemical, the agrochemical vaporizes without any of the vaporized agrochemical being vented to the atmosphere.

21. A system as defined in claim 1, wherein the system is configured to dispense a liquid fertilizer.

22. A system as defined in claim 1, wherein the system is configured to dispense an agrochemical selected from the group consisting of herbicides, insecticides, pesticides, growth regulators, dessicants, defoliants, fungicides, rodenticides, nutrient stabilizers, soil conditioners, root stimulants, and mixtures thereof.

23. A system as defined in claim 1, wherein the system includes a plurality of distribution manifolds for applying agrochemicals simultaneously.

24. A system suitable for dispensing controlled amounts of either a volatile liquid or a non-volatile liquid into a soil, said system comprising:
   a reservoir for holding a liquid agrochemical, said reservoir including an outlet for dispensing said liquid agrochemical;
   a distribution manifold in communication with the outlet of the agrochemical reservoir, the distribution manifold being connected to a plurality of dispensing tubes designed to inject the liquid agrochemical into the soil, the distribution manifold including a plurality of segments, the segments forming a common passageway when assembled together, at least certain of the segments including a dispensing channel placed in communication with a corresponding dispensing tube; and
   a plurality of pressure reducing members, each of the pressure reducing members being located in between the common passageway and the dispensing channels of the distribution manifold, the pressure reducing members creating a pressure reduction between the common passageway and the dispensing channels, wherein, when dispensing a volatile liquid agrochemical, the pressure reducing members cause the volatile liquid agrochemical prior to entering the plurality of dispensing tubes to partially vaporize, but not intermixing with the liquid agrochemical contained in the common passageway thus creating a heat exchange effect which cools the liquid agrochemical contained in the common passageway.

25. A system as defined in claim 24, wherein the pressure reducing members further comprise flow rate control devices.

26. A system as defined in claim 25, wherein each of said flow rate control devices comprises a valve that pulsates between open and closed positions according to a duty cycle.

27. A system as defined in claim 26, wherein said duty cycle of each of said flow rate control devices is determined and controlled by a controller.

28. A system as defined in claim 27, wherein said controller is configured to control said flow rate control devices independently for selectively varying the flow rate of said liquid agrochemical between each of said dispensing tubes.

29. A system as defined in claim 24, wherein each of the pressure reducing members comprises an orifice.

30. A system as defined in claim 24, further comprising a controller in communication with at least one metering device, the controller being configured to control the metering device for dispensing the liquid agrochemical at a desired rate.

31. A system as defined in claim 24, further comprising at least two temperature sensing devices, one of said temperature sensing devices monitoring the temperature of said liquid agrochemical prior to entering the pressure reducing members, the other temperature sensing device monitoring the temperature of the liquid agrochemical after flowing through the pressure reducing members;
   at least two pressure sensing devices, one of the pressure sensing devices monitoring the pressure of the liquid agrochemical prior to entering the pressure reducing members, the other pressure sensing device monitoring the pressure of the liquid agrochemical after flowing through the pressure reducing members; and
   a controller configured to receive information from the temperature sensing devices and the pressure sensing devices and, based on the received information, to control the pressure reducing members for dispensing the liquid agrochemical at desired rate and, when dispensing a volatile liquid agrochemical, at a rate that maintains the volatile liquid agrochemical in the distribution manifold as substantially a liquid.

32. A system as defined in claim 24, wherein, when dispensing a volatile liquid agrochemical, the agrochemical vaporizes without any of the vaporized agrochemical being vented to the atmosphere.

33. A process for dispensing controlled amounts of a volatile liquid agrochemical into a soil, said process comprising the following steps:
   providing a volatile liquid agrochemical in a pressurized vessel, the pressure in said vessel being sufficient to maintain at least a portion of said volatile liquid agrochemical in a liquid form;
   dispensing said volatile liquid agrochemical into a distribution manifold;
   injecting said volatile liquid agrochemical into a soil using a plurality of dispensing tubes, each of said dispensing tubes being in fluid communication with said distribution manifold and with a flow rate control device, said flow rate control devices being placed on said dispensing tubes and being configured to control the flow rate of the volatile liquid agrochemical through the dispensing tubes; and
   wherein the liquid agrochemical prior to entering the dispensing tubes, is vaporizing, but not intermixing with, the liquid agrochemical in the distribution manifold thus creating a heat exchange effect which cools the volatile liquid agrochemical and prevents the liquid agrochemical from vaporizing within said distribution manifold.

34. A process as defined in claim 33, wherein said volatile liquid agrochemical comprises ammonia.

35. A process as defined in claim 34, wherein said ammonia is injected into said soil at an application rate of from about 25 pounds per acre to about 250 pounds per acre.

36. A process as defined in claim 33, further comprising the step of increasing the flow at which said volatile liquid agrochemical is dispensed from said pressurized vessel to the distribution manifold.

37. A process as defined in claim 33, wherein each of said flow rate control devices comprises a valve that pulsates between open and closed positions according to a duty cycle.

38. A process as defined in claim 36, wherein said duty cycle of each said flow rate control device is determined and controlled by a controller.

39. A process as defined in claim 33, further comprising the step of sensing the speed at which said dispensing tubes are moved across a field for determining the flow rate at which said volatile liquid agrochemical is injected into said soil.

40. A process as defined in claim 33, further comprising the step of individually controlling the flow rate at which said volatile liquid agrochemical is dispensed from each of said dispensing tubes.

41. A process as defined in claim 33, wherein individual said flow rate control devices may stop flow altogether to accommodate intermittent system size changes during operation.

42. A process defined in claim 33, wherein the said flow rate control devices possess manually adjustable flow parameters, yielding automatic flow control abilities, but being able to be manually adjusted to provide multiple flow ranges.

43. A process as defined in claim 33, wherein the flow rate control devices are located close to the soil.

44. A process as defined in claim 33, wherein the liquid agrochemical comprises a fertilizer.

45. A process as defined in claim 33, wherein the liquid agrochemical comprises a herbicide, an insecticide, a pesticide, a growth regulator, a dessicant, a defoliant, a fungicide, a rodenticide, a nutrient stabilizer, a soil conditioner, a root stimulant, or mixtures thereof.

46. A process as defined in claim 33, wherein a plurality of liquid agrochemicals are dispensed into a corresponding plurality of distribution manifolds for injecting the agrochemicals into a soil simultaneously.

* * * * *